June 22, 1954
E. J. DEMLOW
2,681,817
SPLIT FLANGE CONNECTOR
Filed Oct. 26, 1950
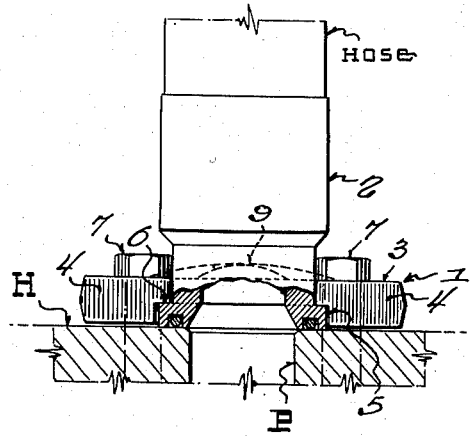
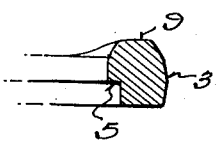
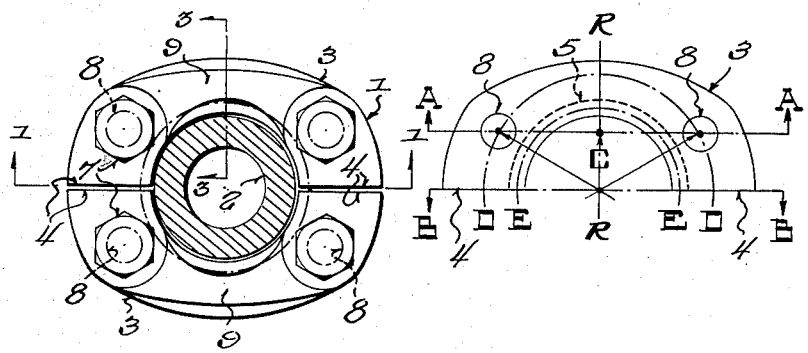
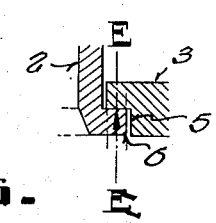
Inventor.
Edward J. Demlow.
By
Attorney.

of the coupling and the wall of the arcuate recess 5 of the sector. As will be noted, line E—E is spaced from the diametric face 4 of the sector.

UNITED STATES PATENT OFFICE 2,681,817

SPLIT FLANGE CONNECTOR

Edward J. Demlow, Libertyville, Ill., assignor to Charles L. Conroy, Waukegan, and Walter Fritsch, Libertyville, Ill.

Application October 26, 1950, Serial No. 192,251

1 Claim. (Cl. 287—20.5)

The present invention relates to split flanges for attaching various types of fittings to objects such as blocks, heads, conduits and the like.

Split flanges are utilized in most instances where it is impossible, or impractical, to assemble a continuous or closed flange on a fitting; and when excessive strains are encountered, it is necessary to make the flange sectors exceedingly bulky and heavy, with, either relatively large, or a multiplicity of attaching bolts, in order to withstand such strains.

To partially overcome the foregoing, split flanges have been devised, in which the sectors overlap or interengage one another to distribute strain or load from one sector to the other. However, flanges of this type are more or less complicated, both in structure and in assembly, as well as costly.

The primary object of the present invention is to provide a comparatively simple, exceedingly compact, light and inexpensive split flange connector, composed of a pair of like component, independent and substantially semi-circular sectors, in which a pair of bolt holes are located in each of said sectors so that the thrust load exerted upon the attaching bolts of the sector is in a direction parallel to the longitudinal axes of the attaching bolts, and evenly distributed to the sector upon both sides of a common plane intersecting the longitudinal axes of said bolts and parallel to the longitudinal plane of the diametric face of the sector.

Incidental to the foregoing, a more specific object of the invention resides in locating the attaching bolt holes in each sector at points on an arcuate line to the axes of the coupling, and intersected by a plane or line passing through the centroid of an arc defining the mean line of thrust load imparted to the sector from the fitting.

With the above and other objects in view, the invention resides in the novel features of construction fully described in the specification, and more particularly defined by the appended claim, it being understood that modifications in structure and design are contemplated within the scope of the invention.

In the drawing:

Figure 1 is a sectional view through a split flange incorporating the present invention, the same being taken on the line 1—1 of Figure 2, illustrating the flange utilized for attachment of a conventional hose coupling to a block;

Figure 2 is a plan view of the flange with the end of the coupling in section;

Figure 3 is a detailed sectional view taken on the line 3—3 of Figure 2;

Figure 4 is a diagrammatic view of one of the flange sectors, for the purpose of explanation of the principles involved; and Figure 5 is a diagrammatic sectional view showing the line of load thrust between the coupling and the flange sector.

Referring now more particularly to the accompanying drawing, H designates a head block to which the present split flange 1 is secured for the purpose of connecting a conventional flanged hose coupling 2 to the block, in sealed alignment with a passage P formed in the block.

It is to be understood that the hose coupling shown is merely for illustrative purposes, inasmuch as the present flange may be used for attaching various types of fittings to any desired object, wherein a tight seal between the fitting and object is required, and the construction or location of the fitting is such that it would be impractical or impossible to assemble a continuous flange upon the same.

The present flange consists of a pair of like component sectors 3, substantially semi-circular in shape, and having flat diametric faces 4 closely opposed to each other when assembled in operative position on a fitting.

The lower faces of the flange sectors 3 are provided with arcuate recesses 5, for reception of a shouldered head 6 formed on the lower end of the coupling 2. The sectors 3, after being assembled on the shouldered head 6, are secured to the block H by attaching bolts 7 passing through bolt holes 8 formed in the sectors.

As best shown in Figures 2 and 3, that portion of the sectors extending between the bolt holes 8 is slightly reinforced by a domed or arcuate boss 9, which from a central radial line intermediate the bolt holes, gradually tapers downwardly toward the upper surface of the sector adjacent the bolt holes, thus forming a sturdy connecting beam for the expanse between the anchored ends of the sector.

As will be noted in Figures 2 and 4, the attaching bolts 7 are evenly spaced from the axes of the semi-circular recesses 5, but so located that the distance between the corresponding bolts of opposite sectors is considerably less than the space between the bolts of each sector.

For a more comprehensive understanding of the principle of the present invention, reference is made to the diagram of Figure 4, in which the arcuate line E—E represents the center or mean line of contact between the shouldered head 6 of the coupling 2 and the flange sectors 3. C indicates the centroid of the arc of line E—E, which is concentric to the axes of the coupling 2 and defines the mean line of lead thrust forces. Necessarily the centroid C must be located on the radius R—R.

As shown in Figure 4, the bolt holes 8 are located on the line A—A, intersecting the centroid C and parallel to the line B—B, which intersects the end of the arc E—E. Incidentally, the line B—B also defines the diametric end faces of the sector. By mathematics it is determined that the thrust load transmitted to each sector by the coupling along the arcuate line E—E is equally distributed upon both sides of the line A—A.

Consequently, in accomplishing the purpose of the present invention, the bolt holes 8 of each sector are located on the line A—A at space points intersected by an arc D—D concentric to the arc E—E, that locates the bolt holes equidistant from the axes of the coupling, as well as from the arcuate line of load thrust E—E and the centroid C.

Obviously, for the purpose of compactness and strength it is desirable to locate the bolt holes 8 as close to the centroid C or radius R—R as possible.

By the foregoing arrangement, the load thrust forces exerted upon the attaching bolts 7 are in a direction parallel to their axes at all times, because each sector is held in static equilibrium upon both sides of line A—A and the radius R—R, which avoids tilting or twisting of the sectors, with resultant lever action, exerting thrust load on the bolts at an angle to their axes.

From the foregoing explanation, considered in connection with the accompanying drawing, it will be readily seen that an extremely simple, compact and sturdy split flange connector has been devised, requiring only four attaching bolts, which is merely two more than required in the simplest form of conventional one-piece flange connectors.

Furthermore, by means of the present invention, the resultant coupling is more compact, and at the same time equally as strong as a one-piece two-bolt flange designed for the same load, which is an important factor where limited space is encountered.

I claim:

A split flange connector comprising a pair of like independent opposed sectors having arcuate semi-circular recesses for reception of a circular shouldered head of a fitting, each sector being provided with only two spaced bolt holes located equidistant from the axes of said semi-circular recesses and in a plane intersecting and parallel to their axes and the centroid of an arcuate line of contact between said recesses and circular shouldered head, said line defining the mean arc of thrust load forces imparted to the sector by said circular shouldered head, said plane also being parallel to a plane being disposed at a right angle to a radius bisecting said arcuate line.

References Cited in the file of this patent

UNITED STATES PATENTS

| Number | Name | Date |
|---|---|---|
| 570,975 | Anderson | Nov. 10, 1896 |
| 674,928 | Mauran | May 28, 1901 |
| 1,443,051 | Steindorf | Jan. 23, 1923 |
| 1,526,647 | Haughey | Feb. 10, 1925 |
| 2,020,365 | Lofton | Nov. 12, 1935 |
| 2,303,311 | Gredell | Nov. 24, 1942 |

FOREIGN PATENTS

| Number | Country | Date |
|---|---|---|
| 3,568 | Great Britain | of 1895 |